(12) United States Patent
Li

(10) Patent No.: US 10,620,362 B2
(45) Date of Patent: Apr. 14, 2020

(54) DISPLAY DEVICE WITH LIGHTPROOF MEDIUMS AND METHODS OF MANUFACTURING THE SAME

(71) Applicant: BOE Technology Group Co., Ltd., Beijing (CN)

(72) Inventor: Wenbo Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 154 days.

(21) Appl. No.: 15/678,376

(22) Filed: Aug. 16, 2017

(65) Prior Publication Data

US 2018/0113251 A1 Apr. 26, 2018

(30) Foreign Application Priority Data

Oct. 21, 2016 (CN) .......................... 2016 1 0921386

(51) Int. Cl.
*F21V 8/00* (2006.01)

(52) U.S. Cl.
CPC .......... *G02B 6/0065* (2013.01); *G02B 6/005* (2013.01); *G02B 6/006* (2013.01); *G02B 6/0011* (2013.01); *G02B 6/0055* (2013.01)

(58) Field of Classification Search
CPC ................. G02F 1/1326; G02F 1/1334; G02F 1/133615; H01L 51/5275; G02B 6/005; G02B 6/0055; G02B 6/006; G02B 6/0065; G02B 6/0011; G09F 13/04
See application file for complete search history.

(56) References Cited

U.S. PATENT DOCUMENTS

| 9,285,531 B2 | 3/2016 | Sherman et al. |
| 2004/0264911 A1* | 12/2004 | Toeda ................. G02B 6/0016 385/146 |
| 2006/0250541 A1* | 11/2006 | Huck .................... F21V 14/003 349/61 |

(Continued)

FOREIGN PATENT DOCUMENTS

| CN | 2541855 Y | 3/2003 |
| CN | 1463369 A | 12/2003 |

(Continued)

OTHER PUBLICATIONS

Second Office Action from Chinese Patent Application No. 201610921386.9, dated Aug. 23, 2017, 11 pages.

(Continued)

*Primary Examiner* — Huyen L Ngo
(74) *Attorney, Agent, or Firm* — Westman, Champlin & Koehler, P.A.

(57) ABSTRACT

The present disclosure provides a display device and a method of manufacturing the same. In one embodiment, a display device includes: an optical waveguide; at least one transparent display module disposed on the optical waveguide, each transparent display module corresponding to one display pattern; an optical source disposed at a light incident side of the optical waveguide, a light emitted by the optical source being transmitted in the optical waveguide, passing through the at least one transparent display module, and exiting the display device; and a lightproof medium disposed on regions of the optical waveguide excepting regions where the transparent display module and the optical source are located.

14 Claims, 2 Drawing Sheets

(56) References Cited

U.S. PATENT DOCUMENTS

| | | | | |
|---|---|---|---|---|
| 2007/0236940 A1* | 10/2007 | Kuroda | ............... | G02B 6/0053 362/339 |
| 2010/0188602 A1* | 7/2010 | Feng | ..................... | G02B 6/005 349/62 |
| 2014/0009508 A1* | 1/2014 | Woodgate | ........... | G02B 6/0048 345/690 |
| 2014/0092626 A1* | 4/2014 | Nakashima | .......... | G02B 6/0055 362/606 |
| 2014/0192285 A1* | 7/2014 | Shinkai | ................. | H04N 13/31 349/15 |
| 2018/0047901 A1* | 2/2018 | Li | ..................... | H01L 51/5275 |

FOREIGN PATENT DOCUMENTS

| | | |
|---|---|---|
| CN | 2620344 Y | 6/2004 |
| CN | 1249459 C | 4/2006 |
| CN | 201053629 Y | 4/2008 |
| CN | 102171593 A | 8/2011 |
| EP | 1398650 A1 | 3/2004 |
| JP | 2003-149637 A | 5/2003 |

OTHER PUBLICATIONS

Search Report from Chinese Patent Application No. 201610921386.9, dated Feb. 16, 2017, 11 pages.
First Office Action, including Search Report, for Chinese Patent Application No. 201610921386.9, dated Apr. 21, 2017, 10 pages.
Third Office Action for Chinese Patent Application No. 201610921386.9, dated Dec. 13, 2017, 10 pages.

\* cited by examiner

DISPLAY DEVICE WITH LIGHTPROOF MEDIUMS AND METHODS OF MANUFACTURING THE SAME

CROSS-REFERENCE TO RELATED APPLICATION

This application claims priority to Chinese Patent Application No. 201610921386.9 filed on Oct. 21, 2016 in the State Intellectual Property Office of China, the disclosures of which are hereby incorporated by reference in their entirety.

TECHNICAL FIELD

The present disclosure relates to the technical field of display, and particularly, to a display device and a method of manufacturing the same.

BACKGROUND

In practical applications of a display device, in many cases, it only needs to display a fixed display image which has been designed in advance. Conventional display devices, by which the fixed display image is displayed, each generally include a display panel and a backlight source. In order to achieve the display function, in these display devices, the backlight source is required to provide a light source to the display panel, and a driving circuit is required to provide a fixed driving voltage to pixel units of the display panel, thereby displaying the fixed display image. Conventional display devices can display fixed display image, however, structures of these display devices are complex and manufacturing processes are relatively complicated.

SUMMARY

According to a first aspect of the present disclosure, there provides a display device comprising:

an optical waveguide;

at least one transparent display module disposed on the optical waveguide, each transparent display module corresponding to one display pattern;

an optical source disposed at a light incident side of the optical waveguide, a light emitted by the optical source being transmitted in the optical waveguide, passing through the at least one transparent display module, and then exiting the display device; and a lightproof medium disposed on regions of the optical waveguide excepting regions where the transparent display module and the optical source are located.

In an embodiment, a plurality of said transparent display modules are disposed on the optical waveguide, at least one said transparent display module of the plurality of said transparent display modules has a refractive index less than a refractive index of the optical waveguide; and wherein, the display device comprises one said optical source, and a minimum incident angle of the light emitted by the optical source when the light enters the optical waveguide is adjustable.

In an embodiment, a plurality of said transparent display modules are disposed on the optical waveguide, at least one said transparent display module of the plurality of said transparent display modules has a refractive index less than a refractive index of the optical waveguide; and wherein, the display device comprises a plurality of said optical sources, and, minimum incident angles of the lights emitted by at least two said optical sources of the plurality of said optical sources when the lights enter the optical waveguide are different, such that the display device can display different display patterns.

In an embodiment, the optical waveguide is a liquid crystal optical waveguide of which liquid crystals have the same orientations.

In an embodiment, the liquid crystals of the liquid crystal optical waveguide are in a parallel orientation state relative to the transparent display module.

In an embodiment, an incident direction of the light emitted by the optical source when the light enters the liquid crystal optical waveguide is normal to a direction of the orientations of the liquid crystals.

In an embodiment, the liquid crystals of the liquid crystal optical waveguide are in a parallel orientation state relative to the transparent display module; and wherein, an incident direction of the light emitted by the optical source when the light enters the liquid crystal optical waveguide is normal to a direction of the orientations of the liquid crystals.

According to a second aspect of the present disclosure, there provides a method of manufacturing a display device and the method comprises the following steps of:

forming an optical waveguide;

forming at least one transparent display module on the optical waveguide, each transparent display module corresponding to one display pattern;

disposing an optical source at a light incident side of the optical waveguide, a light emitted by the optical source being transmitted in the optical waveguide, passing through the at least one transparent display module, and exiting the display device; and forming a lightproof medium on regions of the optical waveguide excepting regions where the transparent display module and the optical source are located.

In an embodiment, a plurality of said transparent display modules are formed on the optical waveguide, at least one said transparent display module of the plurality of said transparent display modules has a refractive index less than a refractive index of the optical waveguide; and wherein, one said optical source is disposed at the light incident side of the optical waveguide, and a minimum incident angle of the light emitted by the optical source when the light enters the optical waveguide is adjustable.

In an embodiment, a plurality of said transparent display modules are formed on the optical waveguide, at least one said transparent display module of the plurality of said transparent display modules has a refractive index less than a refractive index of the optical waveguide; and wherein, a plurality of said optical sources are disposed at the light incident side of the optical waveguide, and, minimum incident angles of the lights emitted by at least two said optical sources of the plurality of said optical sources when the lights enter the optical waveguide are different, such that the display device can display different display patterns.

In an embodiment, the optical waveguide is a liquid crystal optical waveguide of which liquid crystals have the same orientations.

In an embodiment, the liquid crystals of the liquid crystal optical waveguide are in a parallel orientation state relative to the transparent display module.

In an embodiment, an incident direction of the light emitted by the optical source when the light enters the liquid crystal optical waveguide is normal to a direction of the orientations of the liquid crystals of the liquid crystal optical waveguide.

In an embodiment, the liquid crystals of the liquid crystal optical waveguide are in a parallel orientation state relative to the transparent display module; and wherein, an incident direction of the light emitted by the optical source when the light enters the liquid crystal optical waveguide is normal to a direction of the orientations of the liquid crystals of the liquid crystal optical waveguide.

DETAILED DESCRIPTION OF THE EMBODIMENTS

In order to provide a more clear understanding of a display device and a method of manufacturing the same according to embodiments of the present disclosure, the present disclosure will be further described hereinafter in detail with reference to the attached drawings.

Figure 1:
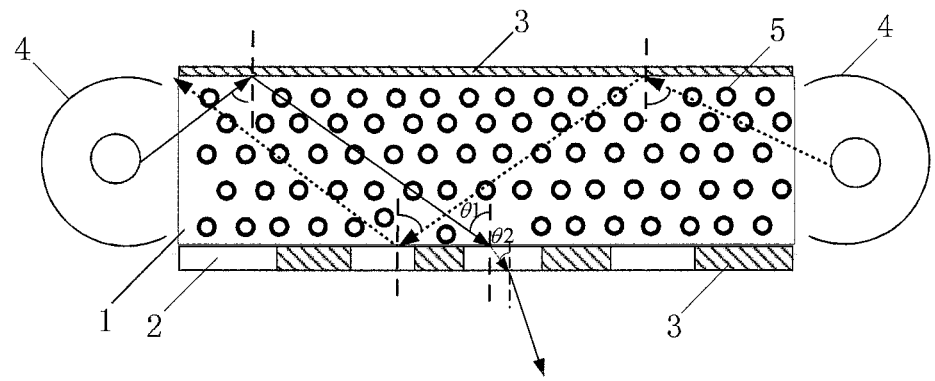
FIG. 1 is a sectional view showing a structure of a display device according to an embodiment of the present disclosure.
Figure 2:
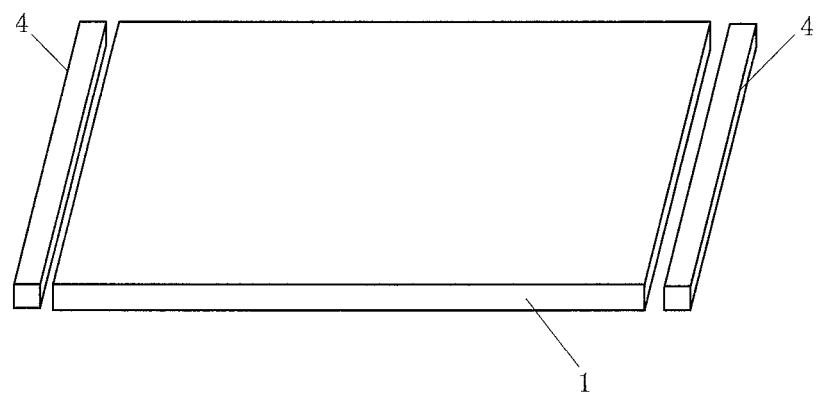
FIG. 2 is a front view showing the structure of the display device according to the embodiment of the present disclosure.

Referring to FIG. 1 and FIG. 2, according to embodiments of the present disclosure, a display device comprises: an optical waveguide 1, a transparent display module 2, and an optical source 4 and a lightproof medium 3. At least one transparent display module 2 is disposed on the optical waveguide 1, and each transparent display module 2 corresponds to one display pattern. The optical source 4 is disposed at a light incident side of the optical waveguide 1, a light emitted by the optical source 4 is transmitted in the optical waveguide 1, passes through the at least one transparent display module 2, and then exits the display device. The lightproof medium 3 is disposed on regions of the optical waveguide 1 excepting regions where the transparent display module 2 and the optical source 4 are located.

It should be noted that, the light emitted by the optical source 4 passes through the at least one transparent display module 2 and then exits the display device. That is, no total reflection occurs when the light goes from the optical waveguide 1 to the at least one transparent display module 2, likewise, no total reflection occurs when the light exits the display device from at least one transparent display module 2. There are two conditions for occurrence of a total reflection, one is that a light is incident on an optically thinner medium from an optically denser medium, the other is that an incident angle of the light incident on the optically thinner medium from the optically denser medium is greater than or equal to its corresponding critical angle for total reflection. A total reflection occurs once the two conditions are satisfied simultaneously. If the light can pass through the at least one transparent display module 2 and then exit the display device, a refractive index of the at least one transparent display module 2 should be greater than a refractive index of the optical waveguide 1, and/or, an incident angle of the light passing from the optical waveguide 1 to the at least one transparent display module 2 is less than its corresponding critical angle for total reflection.

Specific displaying process of the abovementioned display device is as follows. A light emitted by the optical source 4 enters the optical waveguide 1 from a light incident side of the optical waveguide 1 and is transmitted in the optical waveguide 1. During the transmitting of the light, when the light is incident on the lightproof medium 3 from the optical waveguide 1, it cannot exit the display device through the lightproof medium 3 as the lightproof medium 3 is made of lightproof material. Here, the light is reflected and continues to be transmitted in the optical waveguide 1. When the light is incident on the transparent display module 2 from the optical waveguide 1, it goes to the optical waveguide 1 by a total reflection and continues to be transmitted in the optical waveguide 1 if conditions for total reflection are met, or it enters the transparent display module 2 from the optical waveguide 1 and then exits the display device through the transparent display module 2 if conditions for total reflection are not met. It should be noted that, a refractive index of the transparent display module 2 may be set to be less than a refractive index of ambient environment where the display device is used. In this way, the light can exits the display device through the transparent display module 2 and no total reflection occurs. Of course, the present disclosure is not limited to this situation. An incident angle of the light from transparent display module 2 to ambient environment where the display device is used can also be adjustable, in order to avoid occurrence of the total reflection.

In the display device according to embodiments of the present disclosure, the transparent display module 2 where a display pattern to be displayed is provided is disposed on the optical waveguide 1, and the light emitted by the optical source 4 is transmitted in the optical waveguide 1 and passes through the at least one transparent display module 2 and then exits the display device, so that the display pattern of the transparent display module 2 is displayed. Accordingly, if it needs to display a fixed display image, a transparent display module 2 where a display pattern corresponding to the fixed display image is provided is disposed on the optical waveguide 1. In this way, the light emitted by the optical source 4 is transmitted in the optical waveguide 1 and passes through the at least one transparent display module 2 and then exits the display device from the transparent display module 2, so that the display device displays the display pattern corresponding to the fixed display image. The display device, in which only the optical waveguide 1, the transparent display module 2, the optical source 4 and the lightproof medium 3 are adopted, according to embodiments of the present disclosure can display a fixed display image without uses of backlight source and display panel as well as use of driving circuit. Accordingly, the display device according to embodiments of the present disclosure has simple structure and uncomplicated manufacturing processes, and also has relatively lower manufacturing cost compared with conventional display device.

Figure 3:
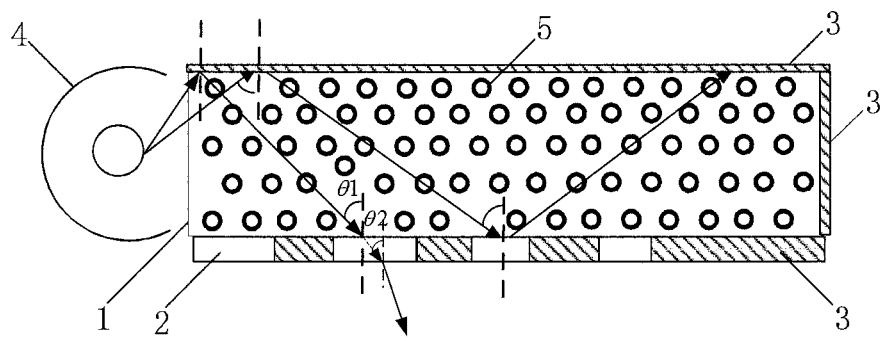
FIG. 3 is a sectional view showing a structure of a display device according to another embodiment of the present disclosure.
Figure 4:
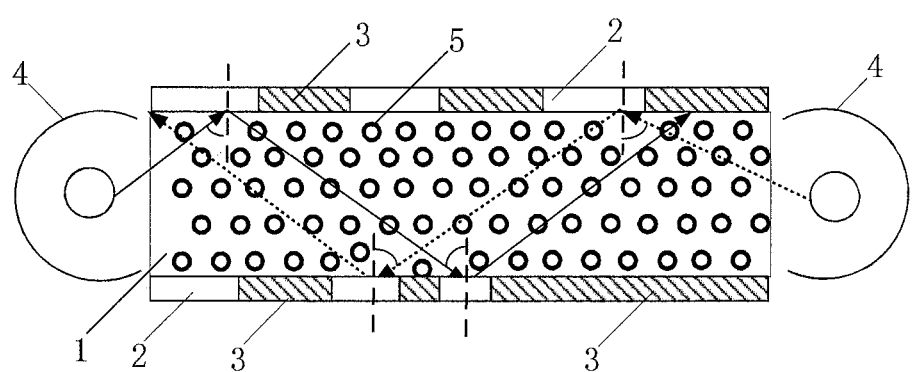
FIG. 4 is a sectional view showing a structure of a display device according to still another embodiment of the present disclosure.

Referring to FIG. 1 and FIG. 3, in practical applications where a display device displays display image, in many cases, the display device not only requires displaying one fixed display image, but also requires switching among a plurality of fixed display images at will. In order to meet the requirements of switching among a plurality of fixed display images at will, a plurality of transparent display modules 2 where respective display patterns corresponding to the display images to be displayed are provided are disposed on the optical waveguide 1, and at least one transparent display module 2 of the plurality of transparent display modules 2 has a refractive index less than a refractive index of the optical waveguide 1. Moreover, in case that the display device comprises one optical source 4, as shown in FIG. 3, a minimum incident angle of the light emitted by the optical source 4 when the light enters the optical waveguide 1 is adjustable. In case that the display device comprises a plurality of optical sources 4, as shown in FIG. 1 or 4, minimum incident angles of the lights emitted by at least two optical sources 4 of the plurality of optical sources 4 when the lights enter the optical waveguide 1 are different, such that the display device can display different display patterns. As a result, the display device enables switching among a plurality of fixed display images at will.

Specifically, for easy description, in the plurality of transparent display module 2, the transparent display module 2 which has a refractive index less than the refractive index of the optical waveguide 1 is named as a controllable display module. When a light is incident on the controllable display module from the optical waveguide 1, it meets the condition that the light is incident on an optically thinner medium from an optically denser medium, accordingly, in case that the display device comprises only one optical source 4 (as shown in FIG. 3), by adjusting a minimum incident angle of the light emitted by the optical source 4 when the light enters the optical waveguide 1, a first incident angle θ1 of the light from the optical waveguide 1 to the controllable display module and a second incident angle θ2 of the light from the controllable display module to the ambient environment where the display device is used are controlled, so that, whether or not total reflection of the light on the controllable display module occurs is controlled, that is, whether or not the display device displays the corresponding display pattern of the controllable display module is controlled. More specifically, if it needs to display the corresponding display pattern of the controllable display module, the first incident angle θ1 and the second incident angle θ2 are adjusted to be greater than respective critical angles for total reflection of the light. If it does not need to display the corresponding display pattern of the controllable display module, the first incident angle θ1 and/or the second incident angle θ2 are/is adjusted so that any one of them is greater than or equal to respective critical angle for total reflection of the light. As a result, switching among different display patterns at will is achieved.

In some embodiments, since the refractive index of the transparent display module 2 is less than a refractive index of ambient environment where the display device is used, no total reflection occurs when the light exits the display device from the transparent display module 2. As a result, adjustment to the second incident angle θ2 is omitted, and thus, switching among different display images of the display device is much simpler.

It should be noted that, the different minimum incident angle is associated with an interface of a refractive index in a different region. If the minimum incident angle is determined, when a light is incident on the transparent display modules 2 from the optical waveguide 1, the range of the refractive index of one of the transparent display modules 2 from which the light can exit is determined. Accordingly, in case that the display device comprises only one optical source 4, by adjusting the minimum incident angle of the light emitted by the optical source 4 when the light enters the optical waveguide 1, the light can be controlled to exit from the designated controllable display module, thereby displaying the designated display image. In addition, the minimum incident angle of the light emitted by the optical source 4 when the light enters the optical waveguide 1 can be adjusted by various manners. For example, adjustment of the minimum incident angle can be implemented, by adjusting location of the optical source 4 relative to the optical waveguide 1, or by altering a light transmission path by means of using grating, prism and the like; of course, it is not limited to these.

In case that the display device comprises a plurality of optical sources 4 (as shown in FIG. 1), the plurality of optical sources 4 may not own adjustable incident angle, that is, each of the optical sources 4 emits light that owns a fixed minimum incident angle when the light enters the optical waveguide 1. In this case, minimum incident angles of the lights emitted by the plurality of optical sources 4 when the lights enter the optical waveguide 1 are different from one another. As a result, the lights emitted by the plurality of optical sources 4 can exit the display device from corresponding designated controllable display modules. In this way, in practical applications of displaying the images by the display device, switching among the plurality of fixed display images can be controlled by turning on/off these optical sources 4.

When a plurality of controllable display modules are disposed on the optical waveguide 1, in accordance with practical display requirements, different materials can be used to manufacture the plurality of controllable display modules with different refractive indexes, respectively. Accordingly, switching among the plurality of fixed display images can be achieved in practical applications of the display device. Various situations will be described and explained in detail hereinafter by taking a display device comprising five controllable display modules with different refractive indexes as an example. The five controllable display modules includes, a first module with a refractive index of n1, a second module with a refractive index of n2, a third module with a refractive index of n3, a fourth module with a refractive index of n4, and a fifth module with a refractive index of n5, here, the optical waveguide 1 has a refractive index of na, and the ambient environment where the display device is used has a refractive index of ng, then, n1<n2<n3<n4<n5<na, and, n5<ng.

Critical angle $\theta_c1$ for total reflection of the first module relative to the optical waveguide 1 is obtained by the following first equation.

$$\theta_c1 = \sin^{-1} n_1/n_a \qquad \text{First Equation}$$

Critical angle $\theta_c2$ for total reflection of the second module relative to the optical waveguide 1 is obtained by the following second equation.

$$\theta_c2 = \sin^{-1} n_2/n_a \qquad \text{Second Equation}$$

Critical angle $\theta_c3$ for total reflection of the third module relative to the optical waveguide 1 is obtained by the following third equation.

$$\theta_c3 = \sin^{-1} n_3/n_a \qquad \text{Third Equation}$$

Critical angle $\theta_c4$ for total reflection of the fourth module relative to the optical waveguide 1 is obtained by the following fourth equation.

$$\theta_c4 = \sin^{-1} n_4/n_a \qquad \text{Fourth Equation}$$

Critical angle $\theta_c5$ for total reflection of the fifth module relative to the optical waveguide 1 is obtained by the following fifth equation.

$$\theta_c5 = \sin^{-1} n_5/n_a \qquad \text{Fifth Equation}$$

From the above first to fifth equations, it is obtained that, $\theta_c1 < \theta_c2 < \theta_c3 < \theta_c4 < \theta_c5$.

Analyses on various display situations of the display device when the first incident angle θ1 of the light from the optical waveguide 1 to the transparent display module 2 meets different conditions are provided hereinafter.

In a first situation of $\theta1<\theta_c1<\theta_c2<\theta_c3<\theta_c4<\theta_c5$, no total reflection occurs when the light goes from the optical waveguide 1 to the first to fifth modules, that is, the light goes from the optical waveguide 1 to the first to fifth modules and exits the display device from the first to fifth modules, thereby displaying the display patterns corresponding to the first to fifth modules.

In a second situation of $\theta_c1<\theta1<\theta_c2<\theta_c3<\theta_c4<\theta_c5$, when the light goes from the optical waveguide 1 to the first to fifth modules, total reflection occurs only on the first module, that is, the light goes from the optical waveguide 1 to the second to fifth modules and exits the display device from the second to fifth modules, thereby displaying the display patterns corresponding to the second to fifth modules.

In a third situation of $\theta_c1<\theta_c2<\theta1<\theta_c3<\theta_c4<\theta_c5$, when the light goes from the optical waveguide 1 to the first to fifth modules, total reflection occurs only on the first and second modules, that is, the light goes from the optical waveguide 1 to the third to fifth modules and exits the display device from the third to fifth modules, thereby displaying the display patterns corresponding to the third to fifth modules.

In a fourth situation of $\theta_c1<\theta_c2<\theta_c3<\theta_c4<\theta_c5<\theta1$, when the light goes from the optical waveguide 1 to the first to fifth modules, total reflection occurs on all the first to fifth modules, that is, the light cannot go from the optical waveguide 1 to the first to fifth modules, in this case, the display device does not display the display patterns corresponding to the controllable display modules.

It should be noted that, in practical applications of the display device, it is not limited to the above four situations. Refractive indexes of these transparent display modules 2 may be adjusted in accordance with practical requirements, and, by adjusting the first incident angle $\theta1$, the light is controlled to exit the display device through a designated transparent display module 2, so that the display device displays a designated display pattern. In addition, when the display device displays, the first incident angle $\theta1$ may be adjusted in real time in accordance with practical display requirements, in order to enable real time switching among the display images.

Various situations of displaying images by the display device will be described and explained hereinafter by taking a display device comprising a plurality of optical sources 4 as an example. For example, the display device comprises a first optical source (e.g., the optical source 4 at left side of the optical waveguide 1, shown in FIG. 1 and FIG. 4) and a second optical source (e.g., the optical source 4 at right side of the optical waveguide 1, shown in FIG. 1 and FIG. 4), and a light emitted by the first optical source is named as a first light (e.g., the light indicated by solid arrow in FIG. 1 and FIG. 4) and a light emitted by the second optical source is named as a second light (e.g., the light indicated by dotted arrow in FIG. 1 and FIG. 4). When the first light goes from the optical waveguide 1 to these transparent display modules 2, incident angles of the first light on the first to fourth modules are respectively greater than critical angles for total reflection of the first to fourth modules, that is, the first light cannot go from the optical waveguide 1 to the first to fourth modules; while incident angle of the first light on the fifth module is less than critical angle for total reflection of the fifth module, that is, the first light can go from the optical waveguide 1 to the fifth module and then exit the display device through the fifth module. When the second light goes from the optical waveguide 1 to these transparent display modules 2, incident angle of the second light on the first module is greater than critical angle for total reflection of the first module, that is, the second light cannot go from the optical waveguide 1 to the first module; while incident angles of the second light on the second to fifth modules are respectively less than critical angles for total reflection of the second to fifth modules, that is, the second light can exit the display device through the second module, can exit the display device through the third module, can exit the display device through the fourth module and can exit the display device through the fifth module. As a result, the first optical source is turned on and the second optical source is turned off if it needs to display only a display pattern corresponding to the fifth module; while, the first optical source is turned off and the second optical source is turned on if it needs to display the display patterns corresponding to the second to fifth modules.

Referring to FIG. 4, the transparent display module(s) 2 of the display device may be disposed at any surface of the optical waveguide 1 in accordance with actual requirements. In this way, when this display device provides a display image, a viewer can observe the display image presented by the display device at various viewing angles, so that the display device is much more practical.

Type of the abovementioned optical waveguide 1 is various, as long as it can transmit light and its direction of light transmission is controllable easily (namely, incident angles of the light on the transparent display modules 2 is controllable easily). In some embodiments, the optical waveguide 1 is a liquid crystal optical waveguide of which liquid crystals 5 have the same orientations. More specifically, the liquid crystal optical waveguide has good light transmission performance. Moreover, the fact that liquid crystals 5 included in the liquid crystal optical waveguide have the same orientations enables first incident angles $\theta1$ of the light from the liquid crystal optical waveguide to the transparent display modules 2 to be better controlled, so that the display device enables switching among the display patterns in a better manner.

In some embodiments, the liquid crystals 5 of the liquid crystal optical waveguide are in a parallel orientation state relative to the transparent display module 2; and/or, an incident direction of the light emitted by the optical source 4 when the light enters the liquid crystal optical waveguide 1 is normal to a direction of orientations of the liquid crystals 5. The fact that the liquid crystals 5 are in a parallel orientation state and/or an incident direction of the light when the light enters the liquid crystal optical waveguide 1 is normal to a direction of orientations of the liquid crystals 5 enables an angle between the light and the direction of orientations of the liquid crystals 5 to be fixed, so that first incident angles $\theta1$ of the light from the liquid crystal optical waveguide to the transparent display modules 2 are better controlled, thereby enabling the display device to obtain accurate switching among the display patterns displayed by the display device.

According to embodiments of the present disclosure, there further provides method of manufacturing a display device and the method comprises the following steps of: forming an optical waveguide 1; forming at least one transparent display module 2 on the optical waveguide 1, each transparent display module 2 corresponding to one display pattern; disposing an optical source 4 at a light incident side of the optical waveguide 1, a light emitted by the optical source 4 being transmitted in the optical waveguide 1, passing through the at least one transparent display module 2, and exiting the display device; and forming a lightproof medium 3 on regions of the optical waveguide 1 excepting regions where the transparent display module 2 and the optical source 4 are located.

In the method of manufacturing a display device according to embodiments of the present disclosure, the transparent display module 2 where a display pattern to be displayed is provided is disposed on the optical waveguide 1, and the light emitted by the optical source 4 is transmitted in the optical waveguide 1 and passes through the at least one transparent display module 2 and then exits the display device, so that the display pattern of the transparent display module 2 is displayed. Accordingly, if it needs to display a fixed display image, a transparent display module 2 where a display pattern corresponding to the fixed display image is provided is disposed on the optical waveguide 1. In this way, the light emitted by the optical source 4 is transmitted in the optical waveguide 1 and passes through the at least one transparent display module 2 and then exits the display device from the transparent display module 2, so that the display device displays the display pattern corresponding to the fixed display image. The method of manufacturing the display device, in which only the optical waveguide 1, the transparent display module 2, the optical source 4 and the lightproof medium 3 are adopted, according to embodiments of the present disclosure can display a fixed display image without uses of backlight source and display panel as well as use of driving circuit. Accordingly, the display device obtained by the manufacturing method according to embodiments of the present disclosure has simple structure and uncomplicated manufacturing processes, and also has relatively lower manufacturing cost compared with conventional display device.

Moreover, the lightproof medium 3 is formed on regions of the optical waveguide 1 excepting regions where the transparent display module 2 and the optical source 4 are located, which ensures that the light transmitted in the optical waveguide 1 will not exit the display device through other regions of the optical waveguide 1 excepting the region where the transparent display module 2 is located. As a result, the display device can display an image in a better manner and avoid light leakage.

It should be noted that, the transparent display module 2 may be formed on the optical waveguide 1 by various methods, specifically, by processes including sputtering, exposing, developing and the like, and of course, it is not limited to this.

In order to enable the display device to implement switching among different display images in accordance with requirement, a plurality of transparent display modules 2 may be formed on the optical waveguide 1, and, at least one transparent display module 2 of the plurality of transparent display modules 2 has a refractive index less than a refractive index of the optical waveguide 1. In addition, in some embodiments, one optical source 4 is disposed on a light incident side of the optical waveguide 1 and emits a light into the optical waveguide 1, and a minimum incident angle of the light is adjustable. In some other embodiments, a plurality of optical sources 4 are disposed on a light incident side of the optical waveguide 1, at least two optical sources 4 of the plurality of optical sources 4 emit lights into the optical waveguide 1, and minimum incident angles of the lights are different, such that the display device can display different display patterns. It should be noted that, the transparent display module 2 of which the refractive index meets conditions may be made of single material or a mixture of several materials. In addition, location of the optical source 4 relative to the optical waveguide 1 may be various, as long as the light emitted by the optical source 4 can enter the optical waveguide 1 and the minimum incident angle of the light entering the optical waveguide 1 is adjustable.

The abovementioned optical waveguide 1 may be made of various materials, as long as it enables a light transmission and a direction of the light transmission can be easily controlled. In some embodiments, anisotropic material or isotropic material having light transmission performance may be used. If anisotropic material is used, liquid crystal material may be selected. Moreover, in order to control transmission of the light in a better manner, liquid crystal material is selected to form an optical waveguide 1 where liquid crystals 5 have the same orientations. It should be noted that, the fact that liquid crystals 5 included in the optical waveguide 1 have the same orientations enables the light transmission in the optical waveguide 1 to follow certain rules, such that, by adjusting the minimum incident angle of the light emitted by the optical source 4 when the light enters the optical waveguide 1 in conjunction with the transmission rules of the light in the optical waveguide 1, the first incident angles of the light from the optical waveguide 1 to the transparent display modules 2 are controlled, that is, display patterns presented by the display device are controlled as well.

In some embodiments, the liquid crystals 5 of the optical waveguide 1 are in a parallel orientation state relative to the transparent display module 2; and/or, an incident direction of the light emitted by the optical source 4 when the light enters the liquid crystal optical waveguide 1 is normal to a direction of orientations of the liquid crystals 5.

Same or like contents of one embodiment described in the description may refer to same or like contents of another embodiment described in the description, although each of them has its focus that is different from those of the other embodiments. Especially, the embodiments for the method generally are same or similar to those for the device, and thus they are described shortly, however, same or like contents of the embodiments for the device may be referred to.

In the above description of the embodiments, these specific features, structures, materials or characteristics can be combined in suitable manner in one or more embodiments or examples.

The above merely are specific embodiments of the present disclosure, but the scope of the present disclosure is not limited to this. It will be apparent for those skilled in the art that some changes and modifications on these embodiments may be made without departing from the principles and spirit of the present disclosure, the scope of which is defined in the claims and their equivalents.

What is claimed is:

1. A display device, comprising:
    an optical waveguide;
    at least one transparent display module disposed on the optical waveguide, each transparent display module corresponding to one display pattern;
    an optical source disposed at a light incident side of the optical waveguide, a light emitted by the optical source being transmitted in the optical waveguide, passing through the at least one transparent display module, and then exiting the display device; and
    a lightproof medium disposed on each of the regions of the optical waveguide excepting regions where the at least one transparent display module and the optical source are located.

2. The display device of claim 1, wherein,
    the at least one transparent display module comprises a plurality of transparent display modules disposed on the optical waveguide, at least one transparent display module of the plurality of transparent display modules has a refractive index less than a refractive index of the optical waveguide; and the optical source is configured to emit light having an adjustable incident angle.

3. The display device of claim 1, wherein, the optical source comprises a first optical source and a second optical source, and the at least one transparent display module comprises a plurality of said transparent display modules disposed on the optical waveguide, at least one transparent display module of the plurality of transparent display modules has a refractive index less than a refractive index of the optical waveguide; and the first and second sources are respectively configured to emit lights having different incident angles.

4. The display device of claim 1, wherein, the optical waveguide is a liquid crystal optical waveguide of which liquid crystals have the same orientations.

5. The display device of claim 4, wherein, the liquid crystals of the liquid crystal optical waveguide are in a parallel orientation to a plane where the at least one transparent display module is located.

6. The display device of claim 4, wherein, an incident direction of the light emitted by the optical source when the light enters the liquid crystal optical waveguide is normal to a direction of the orientations of the liquid crystals.

7. The display device of claim 4, wherein, the liquid crystals of the liquid crystal optical waveguide are in a parallel orientation to a plane where the at least one transparent display module is located; and wherein, an incident direction of the light emitted by the optical source when the light enters the liquid crystal optical waveguide is normal to a direction of the orientations of the liquid crystals.

8. A method of manufacturing a display device, the method comprising the following steps of:

forming an optical waveguide;

forming at least one transparent display module on the optical waveguide, each transparent display module corresponding to one display pattern;

disposing an optical source at a light incident side of the optical waveguide, a light emitted by the optical source being transmitted in the optical waveguide, passing through the at least one transparent display module, and exiting the display device; and forming lightproof mediums respectively on regions of the optical waveguide excepting regions where the at least one transparent display module and the optical source are located.

9. The method of claim 8, wherein, the at least one transparent display module comprises a plurality of transparent display modules formed on the optical waveguide, at least one transparent display module of the plurality of transparent display modules has a refractive index less than a refractive index of the optical waveguide; and the optical source is configured to emit light having an adjustable incident angle.

10. The method of claim 8, wherein, the optical source comprises a first optical source and a second optical source, and the at least one transparent display module comprises a plurality of transparent display modules formed on the optical waveguide, at least one transparent display module of the plurality of transparent display modules has a refractive index less than a refractive index of the optical waveguide; and the first and second optical sources are respectively configured to emit lights having different incident angles.

11. The method of claim 8, wherein, the optical waveguide is a liquid crystal optical waveguide of which liquid crystals have the same orientations.

12. The method of claim 11, wherein, the liquid crystals of the liquid crystal optical waveguide are in a parallel orientation to a plane where the at least one transparent display module is located.

13. The method of claim 11, wherein, an incident direction of the light emitted by the optical source when the light enters the liquid crystal optical waveguide is normal to a direction of the orientations of the liquid crystals of the liquid crystal optical waveguide.

14. The method of claim 11, wherein, the liquid crystals of the liquid crystal optical waveguide are in a parallel orientation to a plane where the at least one transparent display module is located; and wherein, an incident direction of the light emitted by the optical source when the light enters the liquid crystal optical waveguide is normal to a direction of the orientations of the liquid crystals of the liquid crystal optical waveguide.

\* \* \* \* \*